Patented Oct. 1, 1946

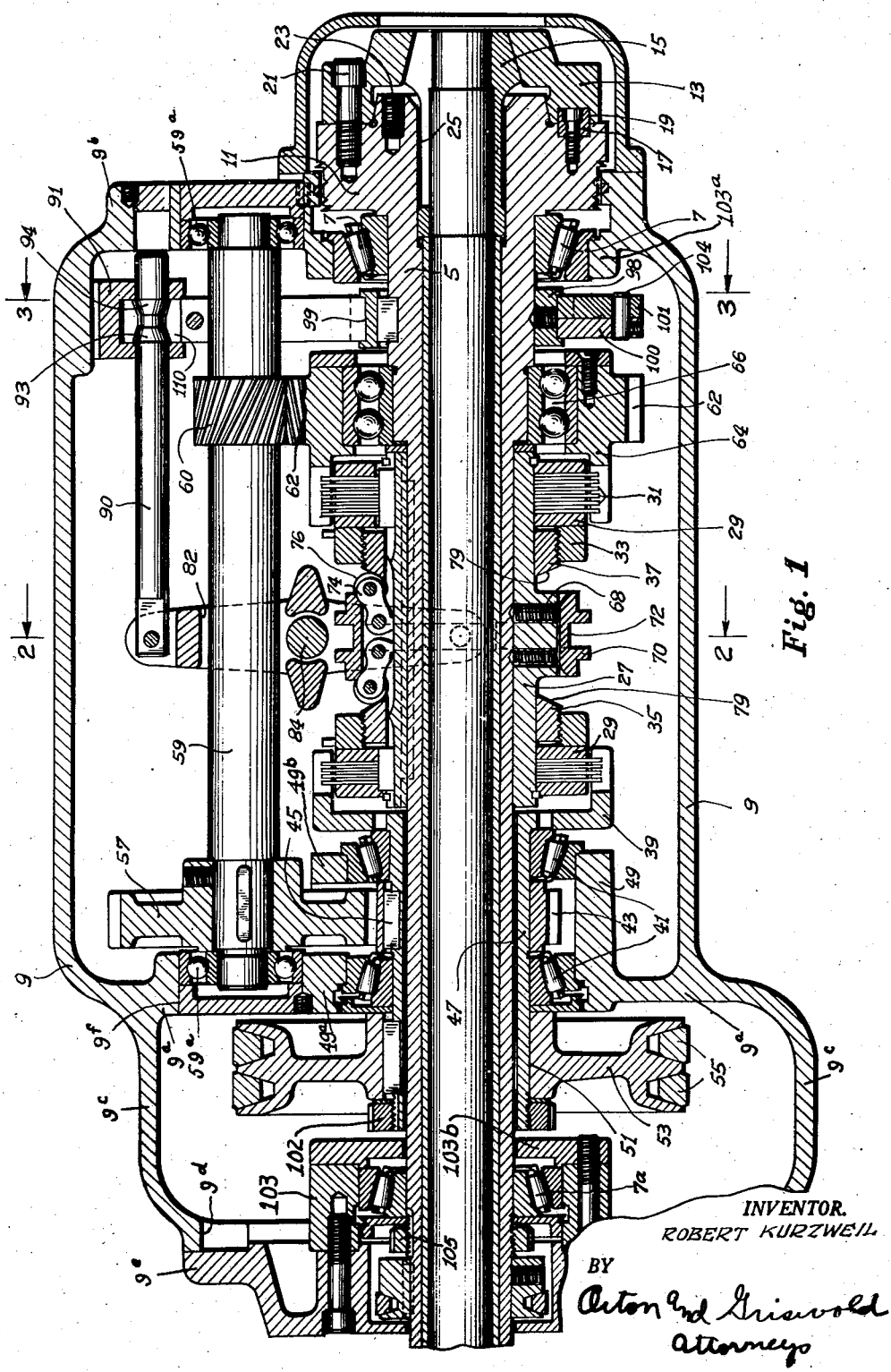

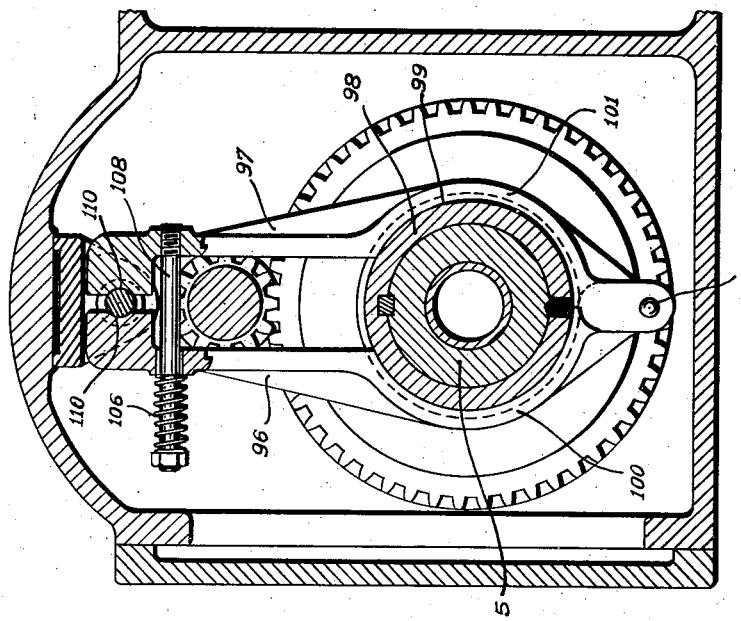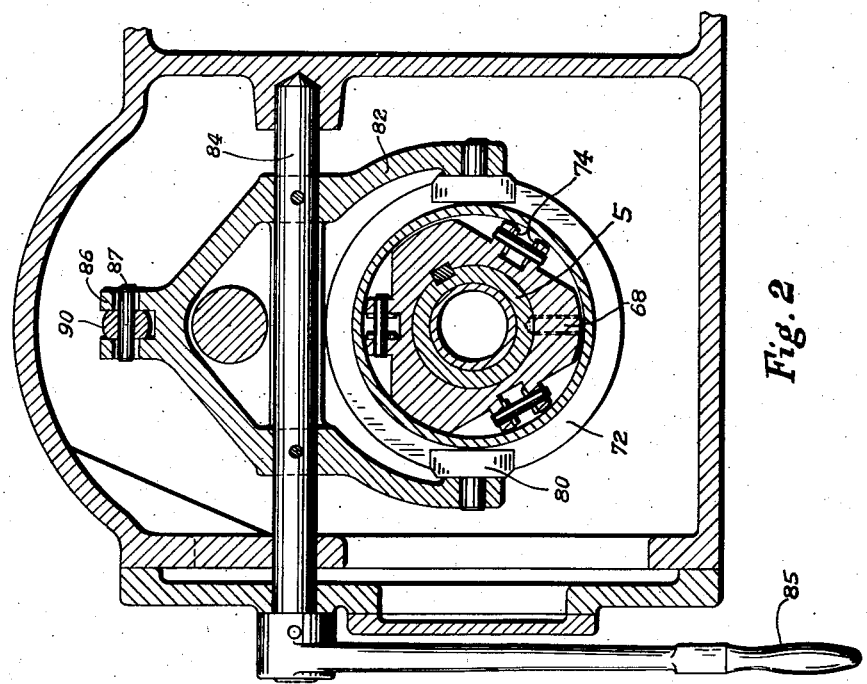

2,408,658

UNITED STATES PATENT OFFICE 2,408,658

TURRET LATHE HEADSTOCK

Robert Kurzweil, Kew Gardens, N. Y., assignor to Morey Machinery Co., Inc., Astoria, Long Island, N. Y., a corporation of New York Application May 5, 1943, Serial No. 485,955

20 Claims. (Cl. 82—28)

This invention relates to headstocks and is particularly directed to a headstock of a turret lathe.

An object of this invention is to provide in a headstock of the character described, improved means to drive the spindle at a high speed range and low speed range. The means for driving the spindle at the high speed range comprises a direct drive on the spindle without the use of gears, thereby eliminating any possible chatter marks on the work piece. The driving connection between the motor and the spindle is by means of rubber belts which provide a smooth drive due to the elasticity of the belts.

A further object of this invention is to provide in a headstock of the character described, a spindle supported in the headstock casing on a pair of bearings, and highly improved means to drive the spindle, including a sleeve telescoped on the spindle and supported in a separate pair of bearings in the headstock casing, a clearance being provided between the sleeve and the spindle, and a clutch comprising a part on the sleeve and a part on the spindle whereby when the clutch is actuated the spindle is driven from the sleeve without imposing any bending moment on the spindle.

With such construction when the clutch is in neutral, the sleeve and spindle run perfectly concentric without touching each other. By actuating the clutch, torque is transmitted from the sleeve to the spindle without any bending moment being imposed on the spindle as a result of the drive. Thus the load caused by belt tension is taken up through the sleeve in the housing or headstock casing itself and does not affect the spindle; and this advantage is due to the fact that the sleeve is separately supported in the headstock and does not rest upon the spindle.

Still another object of this invention is to provide in a headstock of the character described a spindle supported on spaced bearings in the headstock, a sleeve telescoped on the spindle and likewise supported on separate bearings in the headstock, a clutch directly connecting the sleeve with the spindle to provide a high speed range drive for the spindle, there further being provided a low range speed drive, the same comprising a gear mounted by means of a bearing on the spindle and clutched to the spindle, and connected to a gear on the sleeve through back gears. The back gear drive consists of four gears, providing a means of reducing the spindle speed in one step by a given ratio.

Yet a further object of this invention is to provide in a headstock of the character described, a brake normally engaging the spindle when the clutch is in neutral position, and means to simultaneously connect the spindle to either the high speed range drive or the low speed range drive through clutches, and simultaneously release the brake, the construction being such that the clutches and brake are controlled by one single lever. The improved brake actuating device comprises a cam which may be moved in either direction to actuate the brake with a minimum of effort.

Yet a further object of this invention is to provide in a headstock of the character described, a hollow spindle mounted on two tapered roller bearings in the headstock housing, said roller bearings facing each other with the tapers of the rollers in opposite directions, adjustment of both bearings being effected by one nut on the spindle.

Still another object of this invention is to provide in a headstock of the character described a sleeve telescoped on the spindle and clutched to the spindle, with a clearance between the spindle and sleeve, said spindle being supported in the housing likewise by means of a pair of roller bearings facing each other with the tapers of the rollers in opposite directions, and adjustment for both bearings being by means of a single nut, such bearings being furthermore spaced from each other, and said sleeve supporting a gear mounted thereon and between the bearings for engagement with the back gears likewise clutched to the spindle, said sleeve, clutches and back gears being interposed between the two roller bearings which support the spindle, thereby providing a well balanced construction.

Yet a further object of this invention is to provide a compact, rugged and durable headstock of the character described, which shall be relatively inexpensive to manufacture, easy to assemble, which shall be smooth and positive in operation, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings in which is shown one of the various possible illustrative embodiments of this invention, Fig. 1 is a horizontal, cross-sectional view of a headstock embodying the invention taken through the axis of the spindle;

Fig. 2 is a cross-sectional view taken on line 2—2 of Fig. 1; and

Fig. 3 is a cross-sectional view taken on line 3—3 of Fig. 1.

Referring now in detail to the drawings, there is disclosed therein a headstock embodying the invention. The same comprises a headstock casing or housing 9 in which there is mounted a pair of spaced roller bearings 7 facing each other with the tapers of the rollers in opposite directions. Journalled within the roller bearings 7 is a hollow spindle 5 the front end of which is enlarged as at 11. There is attached to said front end by means of screws 21, a retainer 13 for a spring collet 15. A driving button 17 on the head 11 of the spindle registers in blind hole 19 of the retainer 13. The spindle may be furthermore provided with screw threaded apertures 23 for attachment of a chuck thereto, in the manner well known in the art.

Highly improved means is provided for driving the spindle. To this end a portion 49 of casing or housing 9 supports a pair of spaced roller bearings 41 facing each other likewise with the tapers of said roller bearings in opposite directions. It will be noted that the roller bearings 41 are disposed between the roller bearings 7. Telescoped on the spindle 5 is a sleeve 47 journalled within the roller bearings 41 and thus being supported directly by the headstock housing through the roller bearings. A clearance is provided between the sleeve 47 and the spindle whereby said sleeve and spindle are concentric or coaxial.

Keyed to one end portion 51 of sleeve 47 is a pulley 53 engaged by rubber or elastic V belts 55 connected to a motor in the vase of the lathe (not shown) or any other suitable motive power. On the sleeve 47 and between the roller bearings 41 is a pinion or gear 43 keyed to the sleeve as at 45. At one end of the sleeve 47 is a clutch spider 39.

In order to remove a belt 55 for replacement it is contemplated that portions of the housing may be removable to provide access to the belt pulley 53 and removal of the belt 55 therefrom. The headstock housing is formed with parallel walls 9a and 9b provided with through openings 9f receiving the bearings 59a and an extension 9c outwardly of the parallel wall 9a is formed with an opening 9d. The housing is further formed with a bracket like part 103 located therein and spaced from the inner rim of the opening 9d as well as from the parallel wall 9a. A cover 9e is provided for the opening in the extension 9c. The other parallel wall 9b and the part 103 are formed with aligned bearings 7, 7a respectively, in which the spindle 5 is journalled.

The parallel wall 9a is formed with a through opening 9f through which the spindle 5 passes and is supported by the bearing means 41, there being a sleeve 47 surrounding the spindle which is journalled in the bearing means 41.

It will be noted that the sleeve 47 projects beyond the first parallel wall 9a and into the extension 9c of the housing and that the pulley 53 is fixed to that portion of the sleeve which so projects. Thus the pulley is located between part 103 of the headstock housing and the parallel wall 9a and because of this disposition of parts the endless belt, when taken off the pulley may be received through the space between the part 103 and the inner rim 9d of the opening in the extension.

Removal of the pulley belt is thus conveniently accomplished merely by removing the cover 9e and slipping the belt over the annular structure 103.

In the spindle is a double ball bearing 66 and journalled on said ball bearing is a gear 62 provided with a clutch spider 64. Journalled within a pair of horizontal, spaced, ball bearings in the headstock housing is a back shaft 59. Keyed to one end of the shaft 59 is a gear 57 meshing with the gear 43, and carried on said back shaft is also a gear 60 meshing with the gear 62.

Mounted on the spindle 5 and keyed thereto and disposed between the clutch spiders 39 and 64, is a clutch sleeve 27 fixed to the spindle by means of screws 68. On the sleeve 27 is a ring 70 provided with an annular external groove 72. Said clutch is provided with a pair of spaced screw threaded annular members 35 and 37 to which are screwed collars 33. Members 35 and 37 have oppositely tapered inclined surfaces 79. Pivoted to the sleeve 27 are levers or dogs 74 carrying rolls 76 adapted to selectively press against the inclined surfaces 79.

Interposed between one collar 33 and clutch spider 39 are members 29 supporting notched discs 31 receiving said spider 39 within said notches. Engaged by the other collar 33 are members 29 adapted to press against notched discs 31 likewise having notches receiving the spider 64 therein.

The clutch is of well known construction and when the ring 70 is moved to the left the spindle will be clutched to the sleeve to transmit the drive from the pulley 53 directly to the spindle while the back gears idle. Upon movement of the ring 70 to the right, the spindle is clutched to gear 62 whereby the drive for the spindle is through the back gears.

One end of driving sleeve 47 is threaded, and receives a nut 102 which presses the pulley against one roller bearing and pulls up on sleeve 47 so that the clutch spider portion 39 thereof presses against the other roller bearing. The cones of the roller bearings are adapted to press inwardly against parts 49a, 49b of the headstock housing. With such construction the adjustment of the roller bearings 41 is taken up by the single nut 102.

The roller bearings 7a on the extreme left end of the spindle as viewed may likewise be adjusted by means of a nut 105 on a threaded portion of the spindle. By adjusting the nut 105 the cone of roller bearing 7a on the left end of the spindle 5, as viewed is pressed against a bearing cover 103b fixed to a portion 103 of the headstock housing.

Means is provided to selectively actuate the clutches. To this end there is journalled on opposite walls of the housing a vertical shaft 84 supporting a lever fork 82. On the lower bifurcated arms of the fork are shoes 80 engaging in the groove 72 of said ring 70. Fixed to the upper end of shaft 84 is a lever handle 85 to actuate the clutches.

Upon swinging lever 85, fork 82 will swing to shift ring 70, to the right or left, depending upon the direction of movement of the lever, to selectively actuate the high and low ranged speed clutches.

Means is provided to brake the spindle when the clutch is in neutral, and release the brake when either of the clutches are actuated. To this end the upper end of the fork lever 82 is bifurcated as at 86 supporting a transverse pivot pin 87. Pivoted to said pin 87 is a horizontal rod 90, formed with a groove providing a pair of opposite frusto-conical cammed surfaces 93, 94. Said rod passes through openings in a slotted block 91 fixed to the housing.

Keyed to the spindle is a brake drum 98 formed with an external annular groove 99. Surrounding the brake drum are a pair of yokes 96, 97 having substantially semiannular portions 100, 101, engaged within said groove 99.

Said yokes 96, 97 are pivoted together at one end as at 104. The yoke 96 is formed with a through opening; and screwed to the other yoke 97 is a pin 108 passing through said opening and carrying a nut on its outer end.

Interposed between said nut and the yoke 96 is a coil compression spring 106. At the outer ends of yokes 96, 97 are opposite substantially semi-annular ridges 110 engaging the frusto-conical portions 93, 94 of rod 90. When the rod 90 is in a position shown in Fig. 1 of the drawings, the brake is in actuating position and the clutch is neutral.

Upon moving the lever handle 85 in one direction, rod 90 is shifted axially to the right, looking at Fig. 1, to release the brake and clutch the spindle to the sleeve 49. Upon moving the lever handle 85 in an opposite direction, rod 90 shifts to the left to release the brake and connect the other side of the clutch to the gear 62 for driving the spindle through the back gear.

It will now be understood that for the high speed range no gears are used for driving the spindle thus eliminating any possible chatter marks on the work piece. The drive is by means of elastic belts providing a smooth drive.

It will be furthermore noted that the sleeve 47 being journalled directly in the housing does not transmit bending moment to the spindle. Any load caused by the belt tension is taken up by the housing itself and has no effect on the spindle. The sleeve transmits only torque to the spindle through the clutch.

The clutch and brake are operated by a single lever and the brake is automatically released with engagement of the clutch either to the high or low speed side; and conversely the clutch is released as soon as the brake is applied.

The conical surfaces in the brake rod 90 acts as a cam in either direction whereby the release of the brake may be easily affected.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In a headstock, a housing, a pair of spaced bearings in the housing, a spindle journalled within said bearings, a sleeve telescoped on said spindle, bearings in said housing to support said sleeve, means to clutch said sleeve to said spindle, a bearing on said spindle, a gear on said last named bearing, a back shaft parallel to the spindle and journalled within said housing, a gear on said sleeve, gears on said shaft meshing respectively with the gear on said bearing and the gear on said sleeve, and means to clutch the gear on said bearing to said spindle, said sleeve, clutch means and bearing on the spindle being located between the first named pair of bearings.

2. In a headstock, a housing, a spindle journalled thereon, a sleeve telescoped on said spindle and journalled on said housing, a gear on said spindle, back gears connecting said sleeve and gear, a pair of clutch means to selectively clutch the spindle to the sleeve or gear, a brake on said spindle, means to simultaneously release the brake and actuate one of said clutch means, a pulley on said sleeve, and a belt drive for said pulley.

3. In a headstock, a housing, a spindle journalled thereon, a sleeve telescoped on said spindle and journalled on said housing, a gear on said spindle, back gears connecting said sleeve and gear, a pair of clutch means to selectively clutch the spindle to the sleeve or gear, a brake on said spindle, and means to simultaneously release the brake and actuate one of said clutch means, said clutch actuating and brake releasing means including a single lever and means to connect said lever to said clutch means and brake.

4. In a headstock, a housing, a spindle journalled thereon, a sleeve on the spindle, a gear on said spindle spaced from the sleeve, a pair of clutch means to selectively clutch the spindle to said sleeve or gear, a ring on said spindle adapted to actuate said clutch means, a fork pivoted to said housing, one arm of the fork having means to engage said ring, a rod pivoted to another arm of the fork, a brake on the spindle, and means on the rod to operate said brake.

5. In a headstock, a housing, a spindle journalled thereon, a sleeve on the spindle, a gear on said spindle spaced from the sleeve, a pair of clutch means to selectively clutch the spindle to said sleeve or gear, a ring on said spindle adapted to actuate said clutch means, a fork pivoted to said housing, one arm of the fork having means to engage said ring, a rod pivoted to another arm of the fork, a brake on the spindle, means on the rod to operate said brake, and a lever fixed to said fork for oscillating the same.

6. In a headstock, a housing, a spindle journalled thereon, a sleeve on the spindle, a gear on said spindle spaced from the sleeve, a pair of clutch means to selectively clutch the spindle to said sleeve or gear, a ring on said spindle adapted to actuate said clutch means, a fork pivoted to said housing, one arm of the fork having means to engage said ring, a rod pivoted to another arm of the fork, a brake on the spindle, means on the rod to release said brake, and a lever fixed to said fork for oscillating the same, said rod having a groove and said brake comprising a pair of yokes having ridges engaged in said groove, said rod being adapted to open up said yokes when said rod is shifted axially in either direction.

7. A headstock comprising a housing, a pair of spaced bearings in the housing, a hollow spindle journalled within said bearings, a sleeve telescoped on said spindle, bearings in said housing to support said sleeve, means to clutch said sleeve to said spindle, a bearing on said spindle, a gear on said last bearing, a back shaft parallel to the spindle and journalled within said housing, a gear on said sleeve, gears on said shaft meshing respectively with the gear on said bearing and the gear on said sleeve, and means to clutch the gear on said bearing to said spindle.

8. A headstock comprising a housing, a hollow spindle journalled thereon, a sleeve telescoped on said spindle and journalled on said housing, a gear on said spindle, back gears connecting said sleeve and gear, a pair of clutch means to selectively clutch the spindle to the sleeve or gear, a brake on said spindle, and means to simultaneously release the brake and actuate one of said clutch means.

9. In a headstock, in combination, a spindle, a clutch sleeve fixed thereto, a pair of friction clutch means carried in spaced relation on the clutch sleeve including cam means, one of said clutch means including a sleeve, a pulley carried by the sleeve, means to drive the pulley, a gear carried by the sleeve, a back shaft, a gear carried by the back shaft in mesh with the last named gear, the other of said clutch means including a gear, a pinion coacting with the last mentioned gear carried by the back shaft, brake means engaging the spindle and manually actuatable shiftable means formed with opposed cam surfaces coacting with said clutch means to selectively actuate the clutch means and release the brake means.

10. In a headstock, in combination, a spindle, a clutch sleeve fixed thereto, a pair of clutch means carried in spaced relation on the clutch sleeve, one of said clutch means comprising a sleeve, means to drive the sleve, a gear carried by the sleeve, a back shaft, a gear carried by the back shaft in mesh with the last named gear, the other of said clutch means comprising a gear, a pinion coacting with the last mentioned gear carried by the back shaft, brake means engaging the spindle, and shiftable means to selectively actuate the clutch means and release the brake means.

11. In a headstock, in combination, a spindle, a clutch sleeve fixed thereto, a pair of clutch means carried in spaced relation on the clutch sleeve comprising cam means, one of said clutch means comprising a sleeve, means to drive the sleeve, a back shaft, driving connections between the sleeve and the back shaft, driving connections between the other of said clutch means and the back shaft, brake means engaging the spindle, and shiftable means formed with opposed cam surfaces coacting with the clutch cam means to selectively actuate the clutch means and release the brake means.

12. In a headstock, in combination, a spindle, a clutch sleeve fixed thereto, a pair of clutch means carried in spaced relation on the clutch sleeve, a pulley carried by one of said clutch means, means to drive the pulley, a back shaft, driving connections between the pulley and the back shaft, driving connections between the other of said clutch means and the back shaft, brake means engaging the spindle, and means to selectively actuate the clutch means and release the brake means.

13. In a headstock, in combination, a spindle, a clutch sleeve fixed thereto, a pair of clutch means carried in spaced relation on the clutch sleeve including cam means, one of said clutch means comprising a sleeve, means to drive the sleeve, a back shaft, driving connections between the back shaft and the sleeve, driving connections between the other of said clutch means and the back shaft, brake means controlling the spindle, and means to release the brake.

14. In a headstock, a housing, a pair of spaced bearings on the housing, a hollow spindle journalled in said bearings, a sleeve surrounding said spindle and disposed between said bearings, bearing means on the housing to support said sleeve for rotation, a back shaft parallel to the spindle, a gear fixed to said sleeve for rotation therewith, a gear on the back shaft meshing with the gear on the sleeve, a second gear on said back shaft, a gear meshing with the second gear on the back shaft, means to selectively clutch the spindle to the sleeve or to the gear meshing with the second gear on the back shaft, a pulley on the sleeve, and an endless belt to drive the pulley, the bearing means on the housing for supporting the sleeve being disposed between the pulley and one of the spindle bearings.

15. In a headstock, a housing, a pair of spaced bearings on the housing, a hollow spindle journalled in said bearings, a sleeve surrounding said spindle and disposed between said bearings, bearing means on the housing to support said sleeve for rotation, a back shaft parallel to the spindle, a gear fixed to said sleeve for rotation therewith, a gear on the back shaft meshing with the gear on the sleeve, a second gear on said back shaft, a gear meshing with the second gear on the back shaft, means to selectively clutch the spindle to the sleeve or to the gear meshing with the second gear on the back shaft, a pulley on the sleeve, and an endless belt to drive the pulley, the bearing means on the housing for supporting the sleeve being disposed between the pulley and one of the spindle bearings, said clutch means being located between the sleeve bearing means and said one of said spindle bearings.

16. In a headstock, a housing, a pair of spaced bearings on the housing, a hollow spindle journalled in said bearings, a sleeve surrounding said spindle and disposed between said bearings, bearing means on the housing to support said sleeve for rotation, a back shaft parallel to the spindle, a gear fixed to said sleeve for rotation therewith, a gear on the back shaft meshing with the gear on the sleeve, a second gear on said back shaft, a gear meshing with the second gear on the back shaft, means to selectively clutch the spindle to the sleeve or to the gear meshing with the second gear on the back shaft, a pulley on the sleeve, and an endless belt to drive the pulley, the bearing means on the housing for supporting the sleeve being disposed between the pulley and one of the spindle bearings, said clutch means being located between the sleeve bearing means and said one of said spindle bearings, said clutch being located between the two gears on the back shaft.

17. A headstock comprising a housing, said housing having parallel walls, and an extension beyond one of said parallel walls formed with an opening, said housing being further formed with a part located in said extension and spaced from the inner rim of said opening, and from said one of said parallel walls, a cover for the opening in said extension, the other of said parallel walls and said part being formed with aligned bearings, a spindle journalled in said bearings, the first of said parallel walls being formed with a through opening through which said spindle passes, bearing means within said through opening, a sleeve surrounding said spindle and journalled in said last-mentioned bearing means, a back shaft within said housing, bearing means in said parallel walls to support said back shaft, a gear fixed to said sleeve, a gear on the back shaft meshing with the gear on the sleeve, a second gear on the back shaft spaced from the first gear on said back shaft, a gear meshing with the second gear on the back shaft, means to selectively clutch said spindle to said sleeve or to the gear which meshes with the second gear on the back shaft, said sleeve projecting beyond said second parallel wall and into said extension of said housing, a pulley fixed to the portion of the sleeve which projects into said extension of the housing, said pulley being located between said part of said housing and said first parallel wall, and an endless belt on said pulley adapted to be removed from the housing by removing said cover to permit the belt to be moved through the space between said part and the inner rim of the opening in said extension.

18. In a headstock, a housing having parallel walls, and a wall interconnecting the parallel walls, said housing being formed with an extension extending from one of said parallel walls, said extension being formed with an opening, said housing being formed with an integral part located within said opening in said extension, a cover for the opening in said extension, the other of said parallel walls and said part being provided with bearings, a spindle journalled within said bearings, and extending through said housing and extension, the first of said parallel walls being formed with a through opening, bearing means within said through opening, a sleeve supported by said bearing means and surrounding said spindle, a back shaft between said parallel walls, a driving connection between said back shaft and sleeve, means to selectively clutch said spindle to said sleeve or back shaft, said sleeve having a portion projecting into said extension, a pulley fixed to the extending portion of said sleeve, said pulley being located between said part and said first parallel wall, an endless belt on said pulley, said belt being movable between the space between said part and the inner rim of said extension upon removing said cover.

19. In a headstock, a housing, a spindle journalled thereon, a sleeve telescoped on said spindle and journalled on said housing, a gear on said spindle, back gears connecting said sleeve and gear, a pair of clutch means to selectively clutch the spindle to the sleeve or gear, a brake on said spindle, means to simultaneously release the brake and actuate one of said clutch means, and means to rotate said sleeve.

20. In a headstock, a housing, a pair of spaced bearings in the housing, a spindle journalled within said bearings, a sleeve telescoped on said spindle, bearings in said housing to support said sleeve, means to clutch said sleeve to said spindle, a bearing on said spindle, a gear on said last bearing, a back shaft parallel to the spindle and journalled within said housing, a gear on said sleeve, gears on said shaft meshing respectively with the gear on said bearing and the gear on said sleeve, and means to clutch the gear on said bearing, to said spindle.

ROBERT KURZWEIL.